W. D. Stroud,
Cultivator Tooth.

No. 112,862.  Patented Mar. 21, 1871.

Witnesses:
C. H. Harkness
C. C. Lee

Inventor:
William D. Stroud
by Theodor Mungen
his Attorney

UNITED STATES PATENT OFFICE.

WILLIAM D. STROUD, OF OSHKOSH, WISCONSIN.

IMPROVEMENT IN CULTIVATORS.

Specification forming part of Letters Patent No. 112,862, dated March 21, 1871.

*To all whom it may concern:*

Be it known that I, WILLIAM D. STROUD, of Oshkosh, in the county of Winnebago and State of Wisconsin, have invented certain new and useful Improvements in Cultivators; and I hereby declare the following to be a full, clear, and exact description of the same, reference being had to the accompanying drawings, making a part of this specification, in which—

Figure 1:
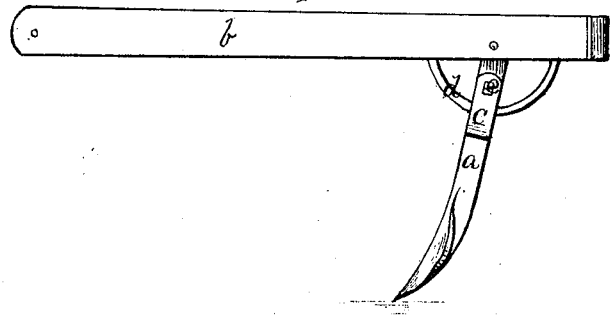
Figure 2:
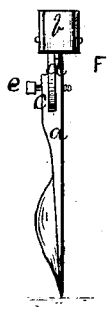
Figure 3:
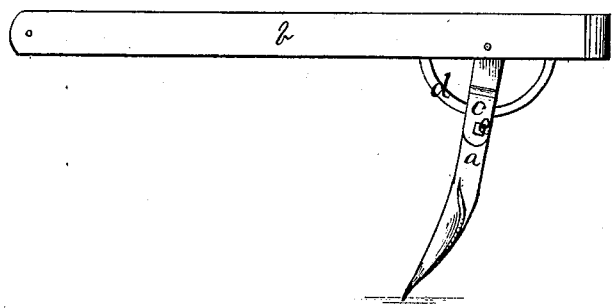
Figure 4:
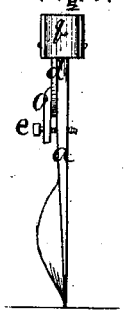

Figure 1 is a side view with the wing welded below the friction-brace. Fig. 2 is a rear view of Fig. 1. Fig. 3 is a side view, the wing welded above the brace. Fig. 4 is a rear view of Fig. 3.

My invention relates to an improvement in cultivators; and it consists of a cultivator-tooth having a lip or wing welded to the side of its shank, and a square-headed screw-bolt passing through the wing into the shank, in combination with a semicircular friction-brace secured to the lag-bar, the whole being arranged in such a manner that the end of the shank swings upon a bolt passing through a mortise in the under side of the lag-bar, and the wing and shank receive the friction-brace between them, and are secured to it by tightening the screw-bolt, so that the tooth will keep its position when used in arable soil, but will slide backward and upward when met by an obstacle, so as to prevent the tooth from being bent or broken.

In the drawings, $a$ is the cultivator-tooth, the upper end of the shank being pivoted in a mortise in the lag-bar $b$, so that the point of the tooth may be swung backward and forward at pleasure.

$c$ is a lip or wing welded to the shank of the tooth $a$, either above or below the point where the friction-brace $d$ crosses the shank. The ends of the brace $d$ pass up through the lag-bar $b$, and are clinched or otherwise fastened on its upper side. The screw-bolt $e$ is provided with a square head, in order that it may be turned by a wrench, so as to draw the wing $c$ and shank of the tooth $a$ tightly enough against the semicircular friction-brace $d$ to hold the tooth in position when used in arable soil, and yet allow the tooth to slide back upon the brace $d$ when met by an obstruction, so that the tooth may not be broken.

The foot of the tooth $a$ is constructed nearly in the shape of a half-diamond, with its corner rounded. It projects from one side of the shank, and scrolls backward, and when operated throws the soil all to one side.

The screw-bolt $e$ passes through the wing $c$ and shank of the tooth $a$, either above or below the semicircular brace $d$, accordingly as the wing $c$ is welded to the shank above or below the point where the brace $d$ crosses the shank.

Having thus described my invention, what I claim as my improvement, and desire to secure by Letters Patent, is—

The wing $c$ and screw-bolt $e$, in their relation to the tooth $a$, friction-brace $d$, and lag-bar $b$, as hereinbefore set forth.

In testimony that I claim the foregoing improvement in cultivators, as above described, I have hereunto set my hand and seal this 7th day of February, 1871.

WM. D. STROUD. [L. S.]

Witnesses:
 GEORGE GARY,
 JOHN P. WILSON.